(No Model.) 3 Sheets—Sheet 3.
G. G. LYNCH.
PLANT SPRINKLER.
No. 260,761. Patented July 11, 1882.
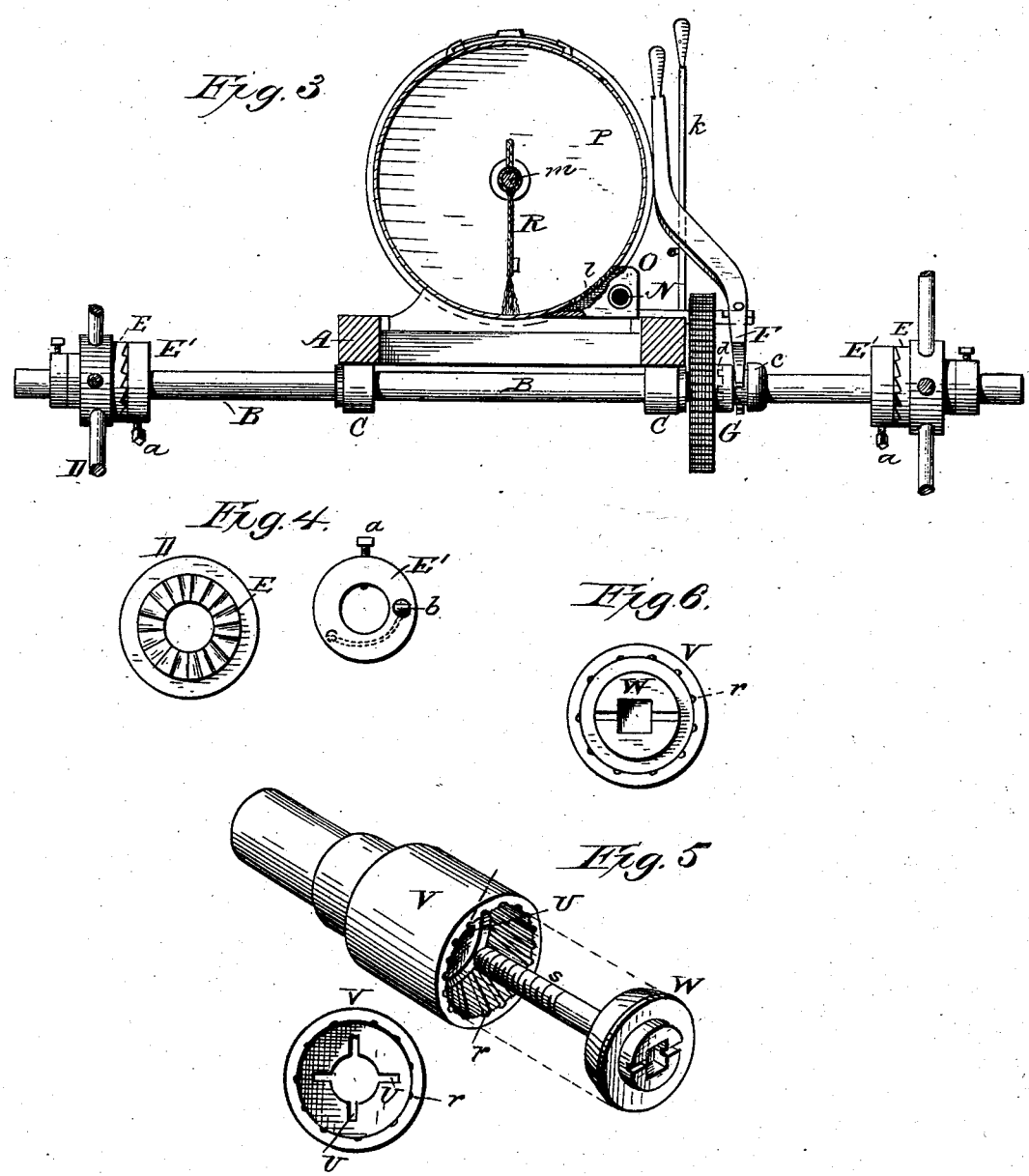
WITNESSES
Franck L. Ourand.
L. L. Miller.
INVENTOR
Garry G. Lynch,
Chas. H. Fowler
By his Attorney

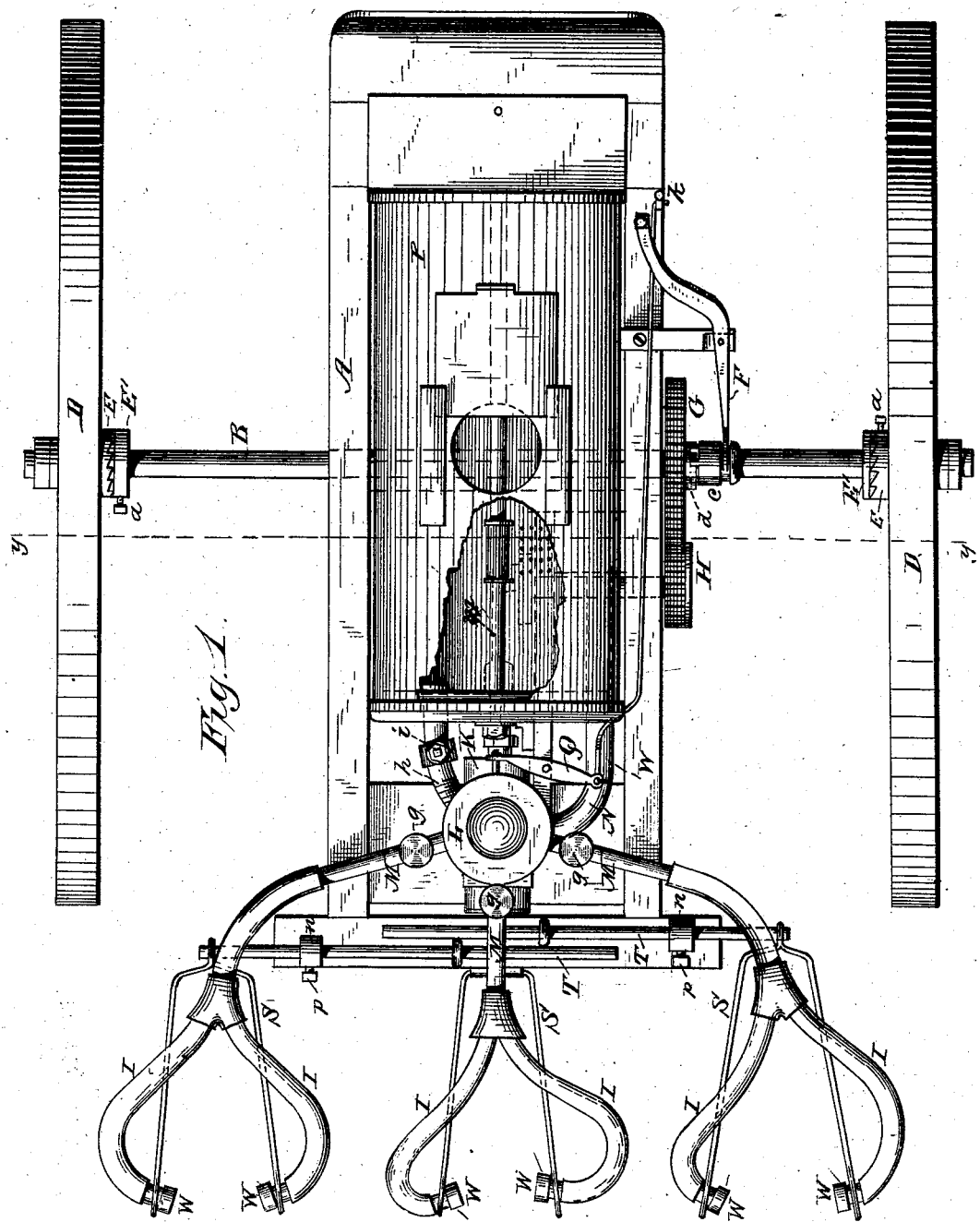

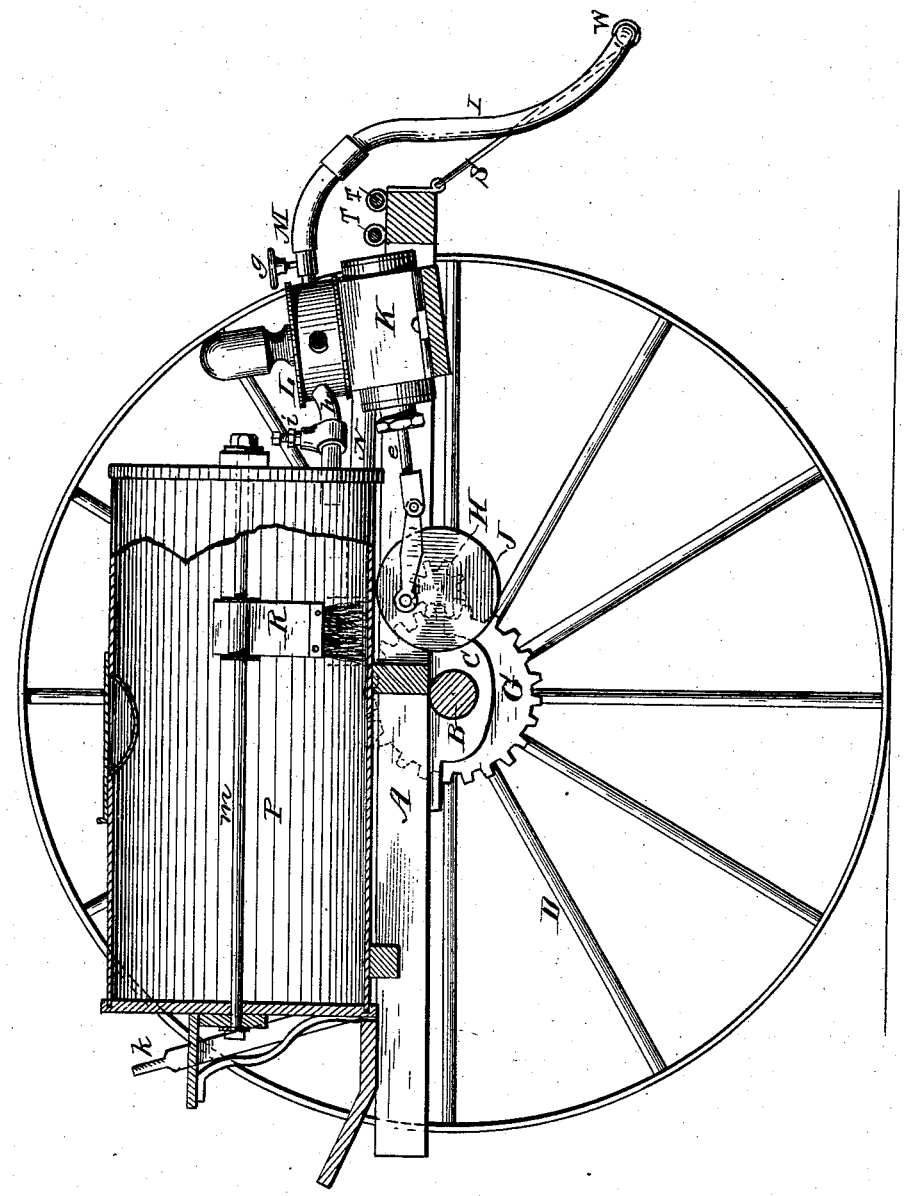

UNITED STATES PATENT OFFICE.

GARRY G. LYNCH, OF ILLAWARA, LOUISIANA.

PLANT-SPRINKLER.

SPECIFICATION forming part of Letters Patent No. 260,761, dated July 11, 1882.

Application filed February 25, 1882. (No model.)

*To all whom it may concern:*

Be it known that I, GARRY G. LYNCH, a citizen of the United States, residing at Illawara, in the parish of East Carroll and State of Louisiana, have invented certain new and useful Improvements in Plant-Sprinklers; and I do hereby declare that the following is a full, clear, and exact description of the same, reference being had to the annexed drawings, making a part of this specification, and to the letters and figures of reference marked thereon.

This invention has for its objects to provide an apparatus for distributing, under pressure, poisonous solutions or liquids, and sprinkling the same simultaneously in numerous streams over growing crops, from a tank or vessel mounted upon a truck adapted to travel or be drawn over a field above the crops, as more fully hereinafter specified. These objects I attain by the apparatus and mechanism illustrated in the accompanying drawings, in which—

Figure 1 represents a top view of my improved apparatus with a portion of the tank broken away, showing the interior. Fig. 2 represents a view partly in vertical longitudinal section and partly in side elevation. Fig. 3 represents a transverse vertical section on the line $y$ $y$ of Fig. 1. Fig. 4 represents detached views of the mechanism for throwing the axle and driving-wheels into and out of gear. Fig. 5 represents a perspective view of one of the nozzles employed for distributing the solution, and Fig. 6 represents a front elevation of said nozzle.

A indicates the carriage or truck of my improved apparatus, and B the axle thereof, journaled in bearings C, attached to the carriage. D indicates the driving-wheels mounted loosely upon the axle, so as to turn thereon when desired and to be shifted longitudinally in order to adjust them to or from each other, according to the nature of the rows of growing crops to be sprinkled. The hubs of the wheels are provided with ratchets E and the axle with loose collars E', which are adapted to be moved longitudinally along the axle and secured by set-screws $a$ at any desired points in order to adjust the wheels. The collars E' are set against the ratchets E, and are each provided with a loose transverse pin or pawl, $b$, (shown in Fig. 4,) which is pressed toward the ratchet by means of a spring, so as to hold the wheel to the axle when the apparatus is traveling forward and permit the wheel to turn on the shaft when backing, and also to permit one wheel to turn when it is traveling faster than the other in turning the apparatus to relieve the axle from strain. The axle is also provided with a sliding clutch, $c$, having an annular groove in which set the arms of a bifurcated lever, F, which is fulcrumed to the carriage, by means of which two or more teeth on the clutch may be made to engage or disengage the teeth on the hub $d$ of a cog-wheel, G, mounted loosely on the axle, so as to carry the teeth with the axle or permit it to rotate thereon, as may be desired, to throw the pump mechanism into or out of gear, the clutch being feathered to the shaft to prevent it from turning with the axle.

The cog-wheel G intermeshes with a pinion, H, mounted on a short shaft journaled in bearings secured to the carriage, the said shaft being provided with a disk, J, having a wrist-pin, to which is connected the pitman of the reciprocating piston-rod $e$ of a pump, K, mounted upon the rear portion of the carriage, the piston-rod being provided with a head at its outer end, which travels on an inclined guide secured to the carriage.

The pump may be of any approved pattern, and is provided with an air-chamber, in order to maintain a uniform pressure at the discharge-nozzles.

The pump is provided with a chamber, L, from which extends a series of eduction-pipes, M, from which extend in turn flexible pipes I, provided with branches having distributing-nozzles W.

The eduction-pipes are provided with valves $g$, by means of which the liquid or solution may be discharged through either or all of them. A pipe, N, extends from a chamber, O, communicating with the lower part of the tank P to the pump, (shown in Fig. 3,) by means of which the solution is supplied to the pump, and from the chamber L extends a pipe, $h$, through the forward head of the tank, the pipe being provided with a spring safety-valve having a set-screw or lever, $i$, by means of which it may be adjusted so as to maintain the desired pressure in the pump, the valve being automatically operated so as to relieve any excess of pressure in the chamber L by permitting the water to flow back into the tank.

The chamber L is provided with a suitable valve, connected with a lever, Q, which connects in turn with an operating-lever under control of the driver, whereby the distribution of the solution may be controlled at pleasure. The opening leading from the tank to the chamber O is covered with wire-gauze or other foraminous material, as shown at $l$, Fig. 3, to prevent solid matter, dregs, and the like from entering the pump; and in order to keep the gauze from becoming clogged the tank is provided with an oscillating brush, R, suspended from a central longitudinal rod, $m$, the said brush being operated by the movement of the solution so as to move back and forth over the surface of the gauze and brush it.

The nozzles secured to the flexible tubes I are supported in proper position by means of the arms S. Each of the outer pairs of arms S, or those extending laterally beyond the sides of the carriage or truck A, are secured to adjustable rods T, by means of which the flexible tubes supported thereby may be adjusted so as to properly distribute the solution over the different rows, as the distance between them may happen to vary. The rods are adapted to be moved back and forth in suitable supports, $n$, and secured therein by means of set-screws $p$, or otherwise.

Fig. 5 represents one of the nozzles, which consists of a short tube, V, havings a series of longitudinal passages, U, on the inside. The forward end of said tube is enlarged, and the interior walls are grooved obliquely, as indicated at $r$, to give the stream of escaping solution a rotary movement. The smaller bore of the nozzle is screw-threaded for the reception of the screw $s$, secured to a beveled head, W, which has a notched projection in front, by means of which the head may be caused to approach to or recede from the mouth of the nozzle, so as to vary the width of the space between the said mouth and the head, and thus regulate the volume of solution escaping from the nozzle.

The operation of my invention will be readily understood in connection with the above description, and is as follows: The driving-wheels are adjusted on the axle according to the nature of the rows and the growing crops to be sprinkled, so that the apparatus may travel over the same, the wheels being of such diameter as to elevate the apparatus a sufficient distance above the crops. The tank being properly charged with the poisonous solution, and the distributing mechanism properly adjusted, the apparatus is driven over the field. The operator may then, at his pleasure, by means of the operating-levers, open the valve in the chamber to which the distributing-pipes are connected, and also start the pump, forcing the liquid through the pipes and discharging it from the nozzles directly over a series of rows in any desired quantity.

Having described my invention, what I claim, and desire to secure by Letters Patent, is—

1. In a plant-sprinkler, the combination, with the tank P, mounted on a carriage or truck, and having suitable distributing-pipes, of the pump K, chamber L, pipe $h$, provided with a suitable safety-valve, and the pipe N, communicating with the tank and chamber O, substantially as and for the purpose specified.

2. In a plant-sprinkler, the combination, with the pump K, chamber O, and pipe N, of the tank P, having the wire-gauze covering $l$, and the oscillating brush R, adapted to operate substantially as and for the purpose specified.

3. In a plant-sprinkler, the combination, with the tank thereof and distributing-chamber, of the pipes I, provided with nozzles and supported by arms S, which are connected to adjustable rods T, substantially as and for the purpose set forth.

In testimony that I claim the above I have hereunto subscribed my name in the presence of two witnesses.

GARRY G. LYNCH.

Witnesses:
R. C. GREEN,
W. S. HUNTER.